UNITED STATES PATENT OFFICE 2,443,796

DIETHYLAMINO ETHYL ETHER OF DIISOPROPYL CARBINE

Henry Martin, Karl Gätzi, and Alfred Margot, Basel, Switzerland, assignors to J. R. Geigy A. G., Basel, Switzerland, a Swiss firm No Drawing. Application August 23, 1944, Serial No. 550,864. In Switzerland August 11, 1943

Section 1, Public Law 690, August 8, 1946
Patent expires August 11, 1963

1 Claim. (Cl. 260—584)

In U. S. Letters Patent No. 2,397,799 (Ser. No. 499,708, filed August 23, 1943) a process for the production of basic ethers of the general formula

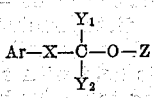

has been disclosed, in which formula
Ar means an aromatic radical
X means the direct linkage or an organic radical which may also contain hetero atoms
$Y_1$ represents hydrogen or like
$Y_2$ a hydrocarbon radical and
Z means a disubstituted aminoalkyl radical.

It has now been found that aminoalkyl ethers of alcohols of the cycloaliphatic series as well as of the aliphatic series having the general formula

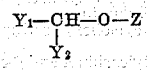

wherein $Y_1$ as well as $Y_2$ mean a cycloaliphatic or aliphatic radical (including also unsaturated radicals) with together at least 6 and at most 13 carbon atoms and Z represents a disubstituted aminoalkyl radical, possess similar properties. Like atropine these cycloaliphatic or aliphatic basic ethers possess a considerable antispasmodic capacity and this especially on the smooth muscular system of the intestines. When applying the new products the usually undesired by-effects of atropine are avoided completely or at least in a great extent. Such an effect could, of course, not be foreseen, as such neurotropic, atropine-like properties have become known heretofore only for basic substituted esters and amides of hydroxy acid derivatives, for example of tropic acid, of amygdalic acid, of benzilic acid, or also corresponding derivatives of benzoic acid, of phenyl acetic acid and their hydrogenation products.

The aminoalkyl ethers of the above definition can be prepared according to various methods. For instance reactive esters of α-substituted cycloaliphatic or aliphatic alcohols, e. g. the halides, can be caused to react, in the presence of agents binding hydrogen halides, with amino alcohols which are disubstituted at the nitrogen atom. On the other hand, also metal compounds of α-substituted cycloaliphatic or aliphatic alcohols can be brought to interaction with reactive basic substituted alkyl esters. By the expression "reactive basic substituted alkyl esters" may be understood the esters of amino alcohols which are disubstituted at the nitrogen atom, especially esters with hydrogen halide acids. Of course, also esters of aryl sulfonic acids and the like can also be used. When causing the same to react with metal salts of α-substituted cycloaliphatic or aliphatic alcohols, the alkali salts of the alcohols are particularly useful. A still further method of production consists in that correspondingly esterified α-substituted ethers, e. g. α-substituted cycloaliphatic or aliphatic halogen alkyl ethers, are caused to react with secondary or tertiary amines. The preparation of the halogen alkyl ethers is carried out advantageously in such a manner that α-substituted cycloaliphatic or aliphatic alcohols or their salts respectively are caused to react with alkylene halogen hydrines or alkylene dihalides in the presence or absence of diluents and that in the resulting compounds the hydroxyl groups which may be present are replaced by halogen.

As α-substituted cycloaliphatic or aliphatic alcohols may be understood secondary alcohols. The substituents in α-position may be for example of aliphatic or hydroaromatic nature. For instance secondary α-substituted cycloaliphatic or aliphatic alcohols can be obtained by catalytical reduction of the corresponding ketones. Secondary alcohols may also be produced according to Grignard by interaction of suitable halides with aldehydes of a corresponding structure. Another method for preparing the basic ethers containing cycloaliphatic groups according to the present invention consists in that the products claimed in Letters Patent No. 2,397,799, such as the α-substituted benzyl ether, are partly or completely catalytically hydrogenated.

By addition of alkyl halides, alkylene halides, aryl sulfonic acid esters, dialkyl sulfates, aralkyl halides, etc. or by interaction of suitable agents yielding oxygen there are obtained in the usual manner quaternary ammonium compounds or oxides when starting from N-disubstituted aminoalkyl ethers.

The appended claim is directed to a preferred compound according to the invention.

The new compounds may be used for therapeutical purposes.

The present invention is now illustrated by the following examples, without being limited thereto. The parts are by weight.

Example 1

To a suspension of 4 parts of powdered sodium amide in 60 parts of absolute benzene are added dropwise 14.5 parts of di-isobutyl carbinol and the whole is stirred for 1 hour at 60° C. Then 13 parts of β-chlorethyl diethylamine or 18 parts of β-bromethyl diethylamine are added, whereupon the mixture is heated for 5 hours under reflux and stirring. After cooling, water is added and the mixture is extracted several times with 10% hydrochloric acid. The combined hydrochloric acid extracts are made alkaline by means of potassium carbonate, the base thus separated is extracted with ether, the ethereal solution washed with concentrated potassium carbonate solution, then dried over sodium sulfate and the ether is finally distilled off. The residue boils at a pressure of 14 mm. at 117°–125° C. The basic ether is clearly soluble in dilute acids.

According to this method the following compounds can be produced:

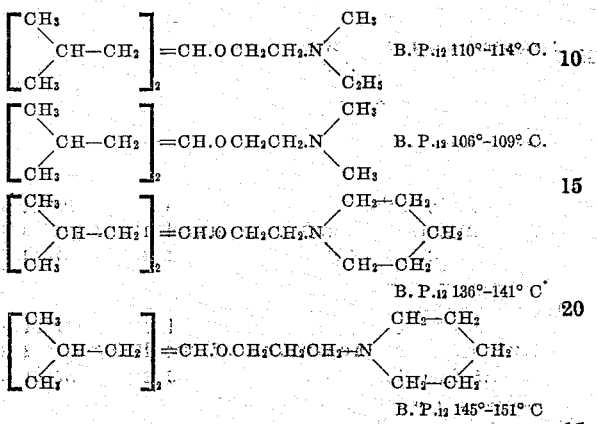

In an analogous manner there are obtained with β-chlorethyl diethylamine from 14.5 parts of n-butyl-isobutyl carbinol a base of the boiling point of 126°–132° C. at 14 mm. pressure, from 14.5 parts of n-propyl isobutyl carbinol a base of the boiling point of 117°–125° C. at 14 mm. pressure and from 11.6 parts of n-propyl isopropyl carbinol a base boiling at 88°–94° C. at 12 mm. pressure.

Example 2

To the sodium salt obtainable from 13 parts of n-propyl isobutyl carbinol and 4 parts of powdered sodium amide in 100 parts of absolute benzene are added 12 parts of γ-chloropropyl dimethylamine and the whole is heated for 6 hours under stirring and under reflux. After working up as above described, the free base is obtained, the same boiling at 105°–108° C. at 14 mm. pressure.

Example 3

1.25 parts of powdered sodium amide are suspended in 50 parts of absolute benzene, then 6 parts of dicyclohexyl carbinol are dropwise added thereto and the whole is stirred for 1 hour at 60° C. Then 6 parts of β-chlorethyl diethylamine are added and the whole is heated under reflux for 8 hours. After cooling, it is extracted with 10% hydrochloric acid, the hydrochloric acid extracts are made alkaline by means of potassium carbonate and the base thus separated is extracted by means of ether. The ethereal solution washed with a concentrated potassium carbonate solution and dried over potassium carbonate is concentrated by distillation and the residue is finally distilled in vacuo; B. P. 151°–154° C. at 3 mm. pressure.

The same product is obtained by a catalytical hydrogenation at 80°–90° C. of cyclohexyl phenyl carbine diethylamino ethyl ether with platinum in glacial acetic acid and small quantities of concentrated sulfuric acid.

Example 4

In an analogous manner the n-propyl cyclohexyl carbine diethylamino ethyl ether, B. P. 12 mm. 131°–137° C. is obtained from 2 parts of sodium amide in 50 parts of absolute benzene, 7.8 parts of n-propyl cyclohexyl carbinol and from 8 parts of β-chlorethyl diethylamine.

The same compound is also produced by a catalytical hydrogenation at 80°–90° C. of n-propyl phenyl carbine diethylamino ethyl ether in glacial acetic acid and small quantities of concentrated sulfuric acid with active platinum.

In the following table further compounds obtainable according to the above examples are enumerated.

| No. | basic ether | B. P. °C. | mm. | made from— |
|---|---|---|---|---|
| 1 | n-propyl-cyclopentyl-carbine diethylamino ethyl ether | 129–137 | 12 | n-propyl cyclopentyl carbinol and β-chlorethyl diethylamine. |
| 2 | do | 165–170 | 12 | n-propyl cycloheptyl carbinol [1] and β-chlorethyl diethylamine. |
| 3 | n-propyl-(cyclohexylmethyl)-carbine diethylamino ethyl ether | 149–156 | 11 | n-propyl-(cyclohexylmethyl)-carbinol and β-chlorethyl diethylamine. |
| 4 | cyclohexyl-(cyclohexylmethyl)-carbine diethylamino ethyl ether | 159–163 | 0.1 | cyclohexyl-(cyclohexylmethyl)-carbinol [2] and β-chlorethyl diethylamine. |
| 5 | cyclopentyl-cyclohexyl-carbine diethylamino ethyl ether | 172–178 | 12 | cyclopentyl cyclohexyl carbinol and β-chlorethyl ethylamine. |
| 6 | butyl-isobutyl-carbine diethylamino propyl ether | 131–137 | 14 | butyl isobutylcarbinol and β-chloropropyl diethylamine. |

[1] Made from cycloheptyl magnesium bromide and n-butyl aldehyde, B. P.$_{11mm.}$ 95°–103° C.
[2] Obtainable from cyclohexyl methyl magnesium bromide and cyclohexyl aldehyde, B. P.$_{11mm.}$ 162°–167° C.

What we claim is:

The di-isobutyl - carbine diethylaminoethyl ether of the formula

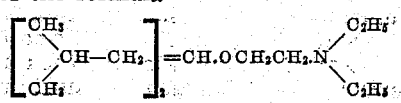

being a colorless liquid of the boiling point 117°–125° C. at 14 mm. pressure, possessing valuable therapeutical properties.

HENRY MARTIN.
KARL GÄTZI.
ALFRED MARGOT.

REFERENCES CITED

The following references are of record in the file of this patent:

UNITED STATES PATENTS

| Number | Name | Date |
|---|---|---|
| 2,204,653 | Bock | June 18, 1940 |
| 2,287,464 | Bock | June 23, 1942 |

FOREIGN PATENTS

| Number | Country | Date |
|---|---|---|
| 521,575 | Great Britain | May 24, 1940 |

OTHER REFERENCES

Chem. Abstracts, vol. 16 (1922), p. 2127; ibid., vol. 29 (1935), p. 6356; ibid., vol. 33 (1939), p. 6845; ibid., vol. 36 (1942), p. 3265.